US010110872B2

(12) United States Patent
Vienne et al.

(10) Patent No.: US 10,110,872 B2
(45) Date of Patent: Oct. 23, 2018

(54) METHOD AND DEVICE FOR CORRECTING DISTORTION ERRORS DUE TO ACCOMMODATION EFFECT IN STEREOSCOPIC DISPLAY

(71) Applicant: THOMSON LICENSING, Issy de Moulineaux (FR)

(72) Inventors: Cyril Vienne, Tinteniac (FR); Laurent Blonde, Thorigne-Fouillard (FR); Didier Doyen, La Bouexiere (FR)

(73) Assignee: Interdigital Madison Patent Holdings, Paris (FR)

( * ) Notice: Subject to any disclaimer, the term of this patent is extended or adjusted under 35 U.S.C. 154(b) by 109 days.

(21) Appl. No.: 14/394,648

(22) PCT Filed: Apr. 8, 2013

(86) PCT No.: PCT/EP2013/057313
§ 371 (c)(1),
(2) Date: Oct. 15, 2014

(87) PCT Pub. No.: WO2013/156333
PCT Pub. Date: Oct. 24, 2013

(65) Prior Publication Data
US 2015/0085087 A1 Mar. 26, 2015

(30) Foreign Application Priority Data

Apr. 19, 2012 (EP) ..................................... 12305457
Dec. 20, 2012 (EP) ..................................... 12306636

(51) Int. Cl.
H04N 13/04 (2006.01)
H04N 13/128 (2018.01)
(Continued)

(52) U.S. Cl.
CPC ......... *H04N 13/128* (2018.05); *H04N 13/122* (2018.05); *H04N 13/144* (2018.05)

(58) Field of Classification Search
CPC ........... H04N 13/0018; H04N 13/0445; H04N 13/004
(Continued)

(56) References Cited

U.S. PATENT DOCUMENTS

2010/0110068 A1* 5/2010 Yamauchi .......... H04N 13/0445
345/419
2011/0074933 A1 3/2011 Held et al.
(Continued)

FOREIGN PATENT DOCUMENTS

CN 102143371 8/2011
CN 102158721 8/2011
(Continued)

OTHER PUBLICATIONS

Smith et al ("Perception of Size and Shape in Stereoscopic 3D Imagery", Proceedings of SPIE, col. 8288, Feb. 6, 2012, p. 828810).*
(Continued)

*Primary Examiner* — Sathyanaraya V Perungavoor
*Assistant Examiner* — Peet Dhillon
(74) *Attorney, Agent, or Firm* — Tutunjian & Bitetto, P.C.

(57) ABSTRACT

The invention concerns a method and a device for correcting distortion errors in a 3D content viewed by an observer on a screen. The method comprises the step of determining a rendered roundness factor (rrf) of a pinhole model projected cylinder, estimating a rendered roundness factor table depending on the defined distance of the observer to the screen and the disparity values of objects of the image, determining for the observer a disparity transform function (TD) as a function of the estimated rendered roundness factor table and modifying the object disparity values using
(Continued)

the disparity transform so that a perceived roundness factor of one is provided.

11 Claims, 5 Drawing Sheets

(51) Int. Cl.
*H04N 13/122* (2018.01)
*H04N 13/144* (2018.01)

(58) Field of Classification Search
USPC .......................................... 348/51; 345/419
See application file for complete search history.

(56) References Cited

U.S. PATENT DOCUMENTS

| | | | |
|---|---|---|---|
| 2011/0181593 | A1 | 7/2011 | Hirai et al. |
| 2011/0311103 | A1* | 12/2011 | Hammarstrom ... G06K 9/00208 382/104 |
| 2011/0316984 | A1 | 12/2011 | Akeley et al. |
| 2013/0088573 | A1* | 4/2013 | Collar ................ H04N 13/0275 348/46 |

FOREIGN PATENT DOCUMENTS

| | | |
|---|---|---|
| JP | 2004200973 | 7/2004 |
| JP | 2005026756 | 1/2005 |
| JP | 2013118515 | 6/2013 |
| WO | 2011/081646 A1 | 7/2011 |
| WO | 2012005962 A1 | 1/2012 |
| WO | 2012/037075 A1 | 3/2012 |

OTHER PUBLICATIONS

Devernay etal: "Adapting stereoscopic movies to the viewing conditions using depth-preserving and artifact-free novel view synthesis", Stereoscopic displays and applications XXII vol, 7863, n° 1, Feb. 10, 2011, pp. 1-12.*

Devernay et al ("Adapting stereoscopic movies to the viewing conditions using depth-preserving and artifact-free novel view synthesis", Stereoscopic displays and applications XXII, vol. 7883, n° 1, Feb. 10, 2011, pp. 1-12).*

Smith etal: "Perception of size and shape in stereoscopic 3D imagery", Proceedings of SPIE, vol. 8288, Feb. 6, 2012, p. 828810.

Watt et Al: "Focus cues affect perceived depth" Journal of Vision, 5(10):7, pp. 834-862.

Search Report dated June 20, 2013.

Office Action for JP Patent Application No. 2015-506175 dated Feb. 27, 2017, eleven (11) pages.

Johnston: "Systematic Distortions of Shape From Stereopsis," Vision Research, vol. 31, Issues 7-8, pp. 1351-1360, Oxford, UK, Aug. 31, 1990.

Didyk et al: "Apparent Stereo: The Cornsweet Illusion Can Enhance Perceived Depth," Proceedings of the SPIE—The International Society for Optical Engineering, vol. 8291, 82910N, (12 pp.), Saarbrucken, Germany, 2012.

* cited by examiner

METHOD AND DEVICE FOR CORRECTING DISTORTION ERRORS DUE TO ACCOMMODATION EFFECT IN STEREOSCOPIC DISPLAY

This application claims the benefit, under 35 U.S.C. § 365 of International Application PCT/EP2013/057313, filed Apr. 8, 2013, which was published in accordance with PCT Article 21(2) on Oct. 24, 2013 in English and which claims the benefit of European patent application No. 12305457.9, filed Apr. 19, 2012 and European patent application No. 12306636.7, filed Dec. 20, 2012.

FIELD OF THE INVENTION

The invention concerns a method and a device for correcting distortion errors due to accommodation effect in stereoscopic display. It takes place in the domain of 3D rendering. In the present invention, the displayed or processed video content is either a stereoscopic or multi-view 3D content.

TECHNOLOGICAL BACKGROUND OF THE INVENTION

A video content in stereoscopic 3D can be seen if a single image is shown for each eye. The differences between both images are called "disparities" which are the slight differences in the points of view.

Given the manner stereoscopic video content are displayed, spectators have to decouple both physiological systems called accommodation and convergence. As a matter of fact, on-screen disparities stimulate the convergence system while the eye accommodation of observer must keep a state to preserve the depth of field around the screen plane in order for vision to remain sharp.

In order to see an object in stereoscopy 3D, spectators have to determine an observation distance on which disparities will be scaled. Thus, observers of stereoscopic content can take into account at least two pieces of information from the visual sequence so as to perceive the simulated depth: convergence which is associated to the disparity signal and accommodation which is associated to the spatial frequencies on the screen. However, the signal of accommodation tends to be predominant in the elaboration of the scaling distance of binocular disparity. This leads to a perceived depth different from the proposed depth.

It corresponds to an over-estimation of depth for crossed disparities (depth in front of the screen) and under-estimation for uncrossed disparities (depth behind the screen). This phenomenon is further described in the document by Watt et al. (2005). Focus cues affect perceived depth. Journal of Vision, 5(10):7, 834-862.

This phenomenon associated to accommodation directly impacts the quality of 3D experience since the 3D space is perceived as distorted. This effect has also been described as corresponding to the "roundness factor" which corresponds to the object width Dx divided by the object depth Dz for a round object. In FIG. 3, for example, the "roundness factor" of the represented element having a negative crossed disparity is 2. It measures how much the object proportions are affected by the distortion. A perfect roundness factor of 1 indicates that no distortion is perceived.

The graph of FIG. 4 displays for a given observer the estimation of the depth Dz of stereoscopic cylinders relative to their width Dx and simulated distance Dvirtual of the observer from the screen plane. X axis represents the stereoscopic (simulated) distance of the cylinder to the observer, Y left axis represents the observer estimation of the cylinder depth and Y right Axis represents the ratio estimated object depth/actual object width. The graph also shows two linear regressions: the first (1) is the regression line for dots representing the estimation of the cylinder depth, the second (2) is for crosses representing the ratio estimated depth on actual width of the cylinder. These regression lines can be used for adjusting stereoscopic content as long as they provide the transform which is operated by the visual system of the observer. The width of the cylinder is always equal to 70 pixels. The magnitude of disparity required to perceive each cylinder increases with the simulated distance. The depth of the cylinder is therefore more and more over-estimated when the cylinder approaches the observer (in front of the screen) and under-estimated when the object goes away (behind the screen). Thus, a distortion of the cylinder appears.

The correction of this distortion is not solved currently. There is no proposition to provide a correct stereoscopic perception.

SUMMARY OF THE INVENTION

The invention proposes to remedy this problem. The invention concerns a method for correcting distortion errors in a 3D content viewed by an observer on a screen.

The method comprises the step of determining a rendered roundness factor of a pinhole model projected cylinder estimating a rendered roundness factor table depending on the defined distance of the observer to the screen and the disparity values of objects of the image, determining for the observer a disparity transform function as a function of the estimated rendered roundness factor table and modifying the object disparity values using the disparity transform so that a perceived roundness factor of one is provided.

This solution allows for a fidelity restitution of the 3D content.

According to an embodiment of the invention the roundness factor of an object corresponds to the object width divided by the object depth for a round object.

According to an embodiment of the invention the disparity values are extraxted from a disparity map associated to the 3D content.

According to an embodiment of the invention the disparity values are calculated from parameters of the observer associated to the 3D content.

According to an embodiment of the invention the disparity and distance to the screen of an object of the 3D content is defined as the average of disparity and average of distance to the screen of each pixel of the object.

According to an embodiment of the invention the object disparity values is modified according to the original values so that the perceived roundness factor equal to unity (prf=1.0) for the observer.

According to an embodiment of the invention the parameters to modify the disparity values are directly implemented in 3D creation software.

The invention proposes also a device for correcting distortion errors in a 3D content viewed by an observer on a screen, The device comprises means for determining a rendered roundness factor of a pinhole model projected cylinder, means for estimating a rendered roundness factor table depending on the defined distance of the observer to the screen and the disparity values of objects of the image, means for determining for the observer a disparity transform function as a function of the estimated rendered roundness factor table and means for modifying the object disparity values using the disparity transform so that a perceived roundness factor of one is provided.

According to an embodiment of the invention, the means for determining a rendered roundness factor corresponds to the cylinder width divided by the cylinder depth for a round object.

According to an embodiment of the invention the disparity values are extracted from a disparity map associated to the 3D content by extracting means.

According to an embodiment of the invention, the disparity values are calculated from parameters of the observer associated to the 3D content by calculating means.

According to an embodiment of the invention, the disparity and distance to the screen of an object of the 3D content is defined as the average of disparity and average of distance to the screen of each pixel of the object.

According to an embodiment of the invention, the means for modifying the object disparity values modifies the object disparity values according to the original values so that the perceived roundness factor equal to unity for the observer.

According to an embodiment of the invention, the means for modifying the object disparity values are directly implemented in means for capturing the real world or in means for capturing the 3D drawing of 3D creation software.

BRIEF DESCRIPTION OF THE FIGURES

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF AN EMBODIMENT

The exemplifications set out herein illustrate preferred embodiments of the invention, and such exemplifications are not to be construed as limiting the scope of the invention in any manner.

A method to modify the disparities of the 3D content as a function of their magnitude and their sign is described so that each variation of disparity induces a constant variation of depth. The sign of the disparity is positive for an object represented behind the screen and negative for an object represented before the screen. This method enables the correction of stereoscopic distortions from the pinhole camera model so that correct stereoscopic perception to localize 3D object at the good position in depth are provided. These distortions correspond to the perception of elongated or flattened 3D shapes. The pinhole camera model is prevalent 3D content creation model widely used for both synthetic and natural content, either as a GCI camera model, or as a representation model for real cameras. It is used as well as basis for 3D image processing of many sorts.

Figure 1:
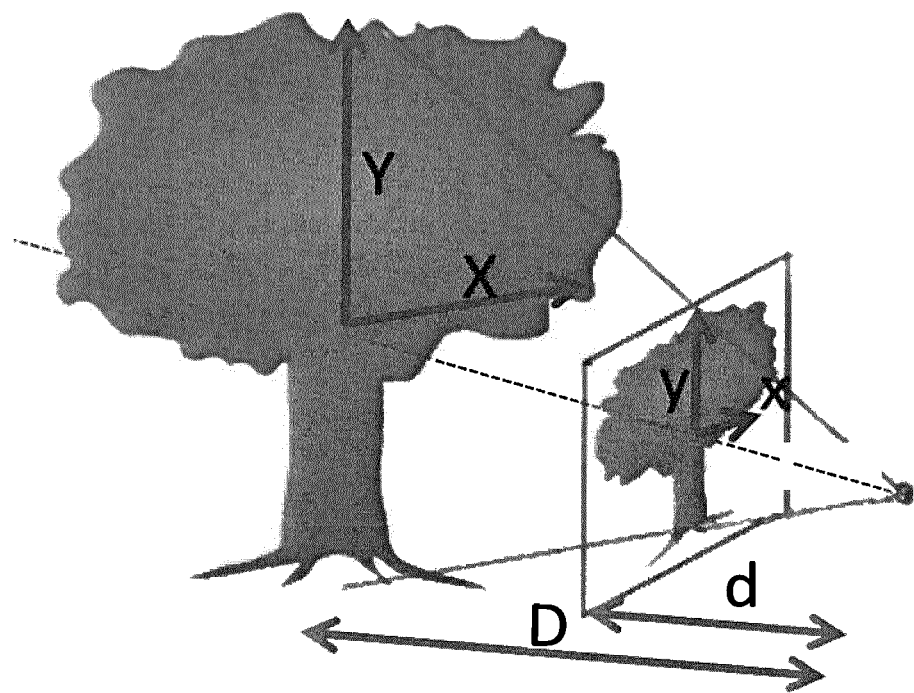
FIG. 1 is an illustration of the perspective projection predict for each eye.
Figure 2:
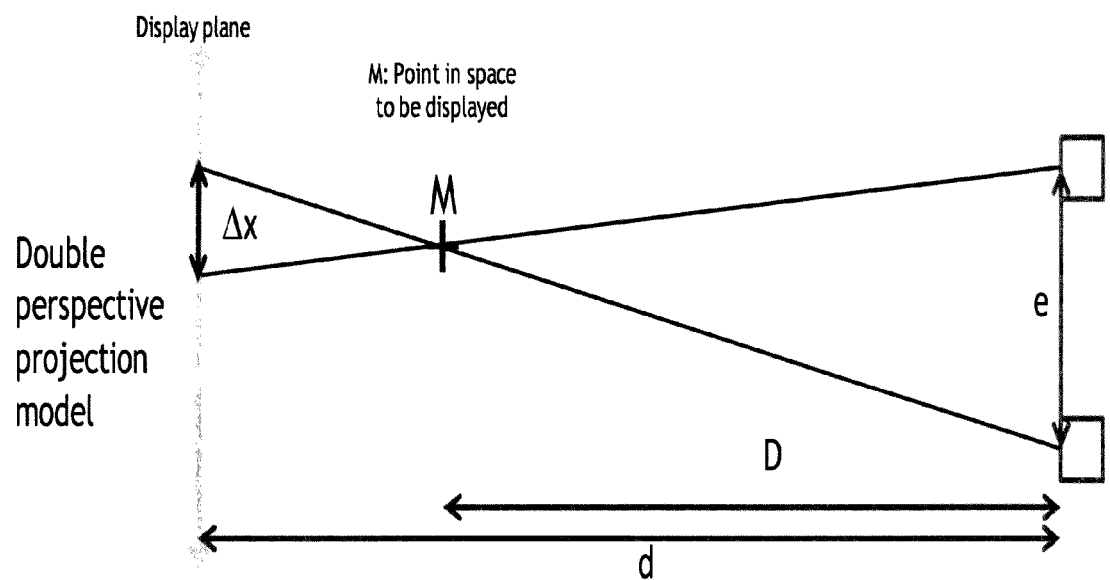
FIG. 2 shows a representation of the disparity computed from the pinhole camera model.

As represented by the FIG. 1 perspective projection predicts for each eye:

$$\frac{x}{d} = \frac{X}{D}$$
$$\frac{y}{d} = \frac{Y}{D}$$

With this model the disparity $\Delta x$ between views for a point to be shown at distance D and for a display at distance d of a viewer is predicted to be $$\Delta x = \frac{e \cdot d}{D}$$

where e is the interocular or inter-pupillary distance of the viewer (see Error! Reference source not found.).

Today this basic pinhole camera model (stenope camera) is widely used to design cameras, in 3D computed generated imagery (CGI) or for 3D images or video processing. This generates 3D images and video with scale/depth distortion or incorrect 3D perspective and motion distortion when compared to human vision.

Compared to natural viewing the pinhole camera model creates images more difficult to visualize, although they are accepted as 3D images by the human visual system. The correspondence with natural space is only partial, valid only for small visual angles around the attention point.

A new proposed solution also consists in modifying the 3D content in order to provide a correct 3D rendering in space since the pinhole model does not take into account this distortion. The pinhole model is a central projection model which only takes into account the geometry of the 3D space independently of the optics and physiology of the eye.

Figure 3:
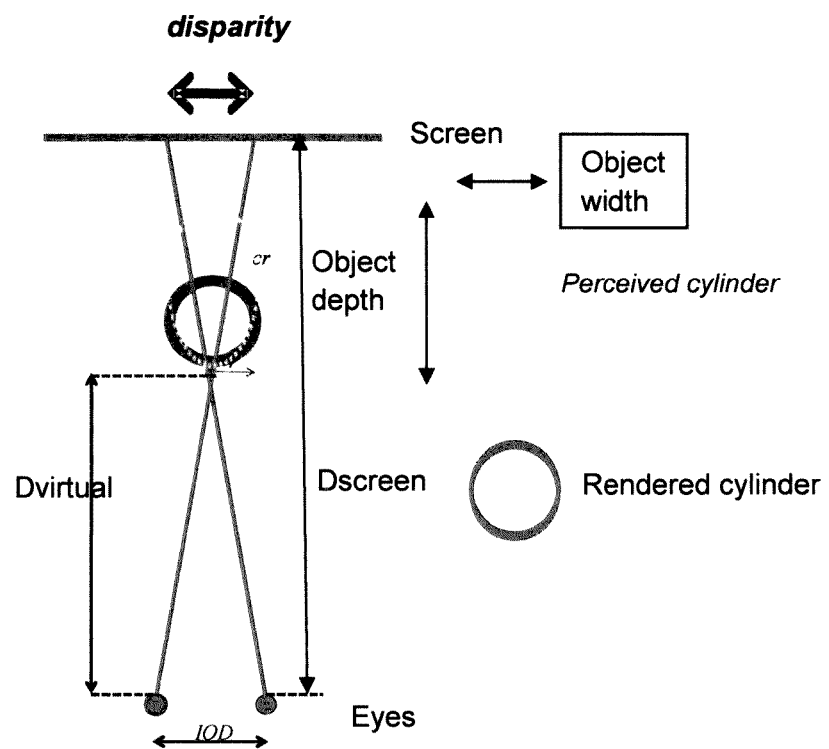
FIG. 3 illustrates the geometrical representation of a cylinder beyond a screen for an observer.

FIG. 3 illustrates the geometrical representation of a cylinder beyond a screen for an observer. With crossed disparities, the cylinder is perceived elongated because disparities are overestimated. This is what happens when the rendered object (dashed blue circle) does not take into account the described distortion.

Considering that when the distance of the observer relative to the screen plane $D_{screen}$ is known, it is possible to retrieve and store how an observer will perceive the roundness of a given stereoscopic cylinder of radius r with a given disparity.

Thus a roundness factor table or function is estimated depending on the observer distance to the screen $D_{screen}$ and presented disparities for an observer. This table or function can be inverted to obtain the disparities providing a roundness factor of 1 for a given object distance to the screen.

The solution proposed by the invention is thus to recompute the disparities of the 3D content to provide a veridical correct perception of depth corresponding to a roundness factor equal to one.

Consequently, captured physical objects or CGI rendered objects will be perceived as the correct depth and with a correct shape when stereoscopically displayed.

Different alternatives to this solution are part of the invention.

An object created with an initial projection model (e.g. the pinhole projection model) is presented to an observer on a stereoscopy display with disparity and position on screen.

This disparity and position on screen is defined as the average of the disparity and distance to the screen of each part of this object in the visual space of the given observer.

Per example, a local volume is given to an object, for example a cylinder, with points in disparity computed relative to each observer's eye position, and depending on the average distance to the screen. The rendered roundness of this object, defined by relative disparities, is a variable in order to present to the observer different instances of the object with different rendered roundness factors. The rendered roundness factor $$rrf=Dz/Dx$$

where Dz is the depth measure and Dx is the width measure of a 3D round object [e.g. a flattened or elongated cylinder] projected with the initial projection model. The rendered roundness factor rrf characterizes the intended flatness or elongation of the rendered pseudo-cylinder.

In varying the average distance to the screen, $D_{screen}$, of the observer, and in function of the rendered roundness factor (rrf), a perceived roundness factor (prf) is estimated for each observer. The results are stocked in a table t so that:

$$prf=t(D_{screen}, rrf),$$

which can be interpolated to a function f: $prf=f(D_{screen}, rrf)$.

A solution consists to solve the interpolated function f $(D_{screen}, rrf)=1.0$ in order to find the distance and rendered roundness factor (dist, rrf) parameters of configurations preserving the perceived roundness factor to one (prf=1.0).

An another solution consists in first deriving the function $$rrf_{(prf=1)}=g(\text{dist})$$

giving the rendering roundness factor for each distance to the screen $D_{screen}$ which will create a perceived roundness factor equal to unity (prf=1.0) for the observer and second in modifying the disparities in an image or video, originally created with the initial projection model, with the function $rrf_{(prf=1)}=g(\text{dist})$.

Obtention of the stereoscopic content can be obtained either in a first case through a visual capture of the real world or in a second case from a capture of 3D drawing.

In the first case, as the stereoscopic content is obtained through a visual capture of the real world, an algorithm modifies the magnitudes of the disparity according to the original values so that the perceived roundness factor equal to unity (prf=1.0) for the observer.

In the second case, as the stereoscopic content is obtained from a capture of 3D drawing, the parameters to modify the disparity amplitudes are directly implemented in the 3D creation software such as a CGI (for Compute Generated Imagery).

Figure 4:
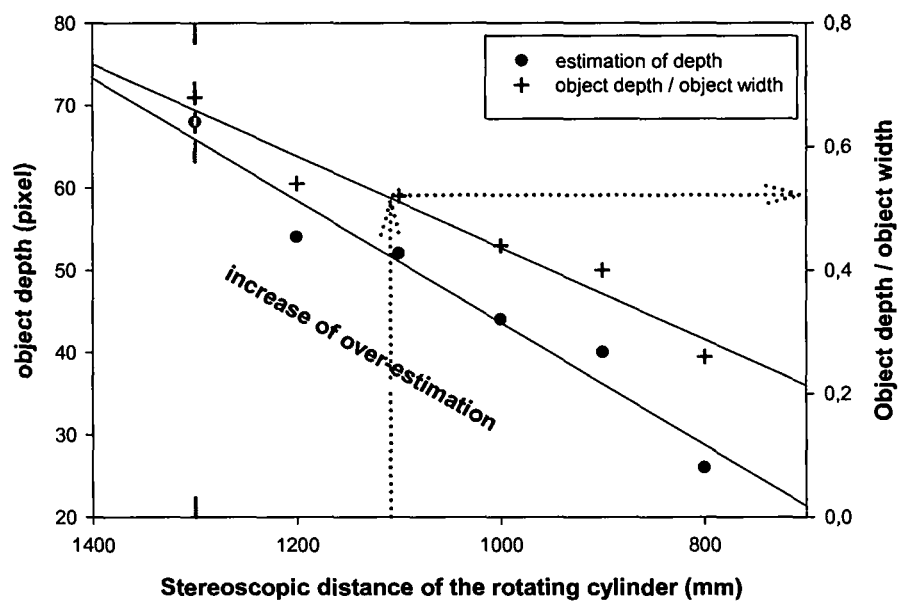
FIG. 4 shows a graph representing the object disparity (left Y-axis) or the roundness factor (right Y-axis) relative to the distance of the cylinder to the observer necessary to perceive undistorted object.

Some particularities are related to inter-individual variability such as the slope of the linear regression depicted on the FIG. 4. It can likely vary depending of spectators. Thus, the content has to be adjusted according to their characteristics.

The weighting model between accommodation and vergence can be used as determinator of correcting factor, instead of the punctual estimation of observer characteristics. It merely assigns one weight to each cue. The corresponding weight can be derived from the literature and averaged data from observers' estimations.

As example and according to the classical model, the disparity of the center of a cylinder:

$$disparity_c=IOD-IOD\cdot D_{screen}/D_{virtual},$$

IOD is the inter-ocular distance, $D_{screen}$ is the distance from the observer to the screen and $D_{virtual}$ is the simulated distance which one wants to display for a viewing distance to the screen Dscreen.

According to FIG. 3, an object located at $D_{virtual}=1.1$ m relative to the observer will have an on-screen disparity of disp=12 mm for its reference point for a screen distance of $D_{screen}=1.3$ m. The center matches with a point f of fixation corresponding to the distance at:

$$D_{fixation}=IOD\cdot D_{screen}/(IOD-\text{disp}).$$

The nearer point belonging to the cylinder around the center of the object will have a disparity of:

$$disp=IOD-IOD\cdot D_{screen}/(D_{fixation}-2r)$$

r being the radius of the cylinder. The value of the <<roundness factor>> is rrf=Dz/Dx for the perceived-pinhole model projected-cylinder at distance $D_{fixation}$.

According to this present correction, based on observer data, the corrected disparity which should be displayed to give rise to the perception of a "perfect cylinder" is:

$$disp_{corrected}=IOD-IOD\cdot D_{screen}/(D_{fixation}-2r/rrf).$$

An object appearing flattened in z with the pinhole projection model (e.g. rrf=0.5) has to be presented extended in z in a corrected projection image pair to be perceived with the adequate/intended depth (e.g. r becomes r/0.5=2·r).

This correction may be realized for each point of observation on visual sequence.

When considering objects of local depth $\Delta z$ ($\Delta z$ would be equal to 2r for the above cylinders) the true disparity transform is depending on the local depth of the object $\Delta z$ and of the perceived roundness factor rrf with the pinhole model. It is of the form:

$$disp_{true}=disp_{corrected}+IOD\cdot D_{screen}(1/(D_{fixation}-\Delta z)-1/(D_{fixation}-2r/rrf))$$

according to the $T_D$ transform of FIG. 4.

Figure 5:
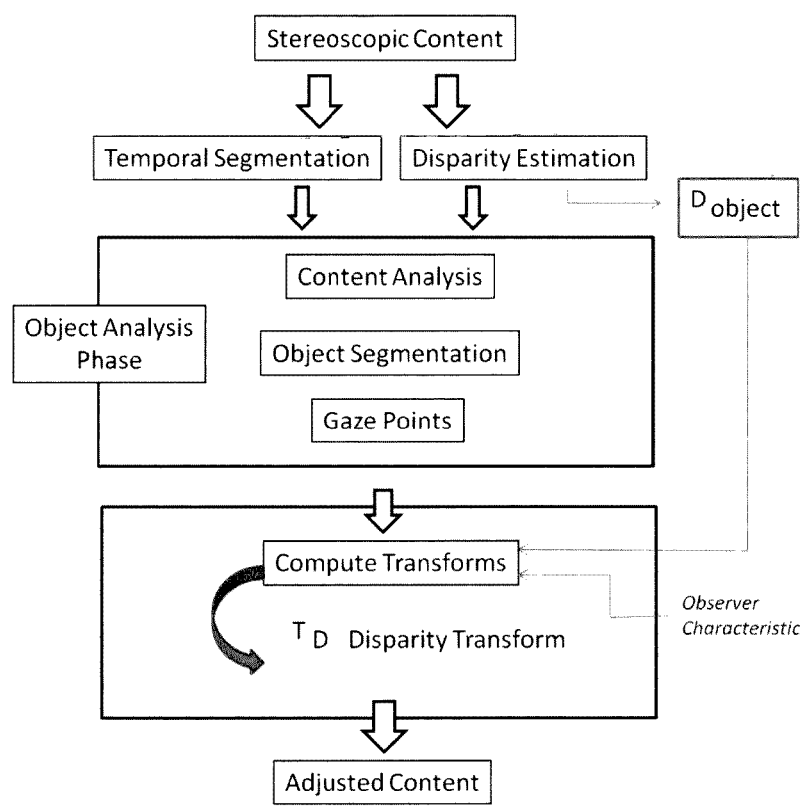
FIG. 5 is a schematic representation of a method according to a preferred embodiment of the invention.

One mode of implementation consists in a content adaptation as shown by the FIG. 5.

It comprises:

A first step consisting in a temporal segmentation of the content and an estimation of the disparity map. The temporal segmentation permits to separate a unique image for which a disparity map will be extracted.

Then, a second step consists in an object analysis phase. A content analysis and object segmentation permits to determine a reference point of objects in the content. For this determination, a saliency map based on psychological attention models can be used. A particular gaze point corresponding to an important saliency which capt the attention of the observer is also determined in the image.

A third step consists in an estimation of the object disparity $D_{object}$ for each frame in a sequence. Binocular eye-gaze tracking can be used to estimate the points-of-gaze (POG) of a subject in real-world three-dimensional (3D) space using the vergence of the eyes.

Next step consists in the establishment of the disparity transform $T_D$ taking account of observer characteristic such as interocular distance and distance to the screen and In a next step the modification of the disparity values of the content is done through the transform $T_D$.

Potential applications concern all stereoscopic content such as movies, TV, games, medical imaging and may be calibrated as a function of user characteristics. This solution would be also useful for applications requiring high precision in stereoscopic imaging.

The invention claimed is:

1. A method for correcting distortion errors in a 3D content viewed by an observer on a screen comprising:
   determining a rendered roundness factor for the observer of the 3D content depending of a defined distance of the observer to the screen and of the disparity associated with said 3D content; and
   determining for the observer a disparity transform function being defined as a function of the determined rendered roundness factor, the function taking into account said defined distance, whatever a value of the defined distance is, so that the disparity values of all objects of the 3D content are corrected for obtaining a perceived roundness factor of one.

2. The method for correcting distortion errors in a 3D content as claimed in claim 1, wherein the parameters to modify the disparity values are directly implemented in a 3D creation software.

3. The method for correcting distortion errors in a 3D content as claimed in claim 1, wherein the rendered roundness factor corresponds to a ratio being equal to the object width divided by the object depth, for a round object.

4. The method for correcting distortion errors in a 3D content as claimed in claim 1, wherein the disparity values are extracted from a disparity map associated with the 3D content.

5. The method for correcting distortion errors in a 3D content as claimed in claim 1, wherein the disparity values are calculated from parameters of the observer associated with the 3D content.

6. The method for correcting distortion errors in a 3D content as claimed in claim 4, wherein the disparity and distance to the screen of an object of the 3D content is defined as the average of disparity and average of distance to the screen of each pixel of the object.

7. A device for correcting distortion errors in a 3D content viewed by an observer on a screen, comprising:
   a memory; and
   at least one processor coupled to the memory, the at least one processor being configured to:
   determine a rendered roundness factor for the observer of the 3D content depending on the defined distance of the observer to the screen and on disparity; and
   determine for the observer a disparity transform function being defined as a function of the determined rendered roundness factor, the function taking into account said defined distance, whatever a value of the defined distance is, so that the disparity values of all objects of the 3D content are corrected for obtaining a perceived roundness factor of one.

8. The device for correcting distortion errors in a 3D content as claimed in claim 7 wherein the at least one processor is further configured to divide a cylinder width by a cylinder depth for a round object, when it determines the rendered roundness factor.

9. The device for correcting distortion errors in a 3D content as claimed in claim 7, wherein the at least one processor is further configured to extract the disparity values from a disparity map associated with the 3D content.

10. The device for correcting distortion errors in a 3D content as claimed in claim 7, wherein the at least one processor is further configured to compute the disparity values from parameters of the observer associated with the 3D content.

11. The device for correcting distortion errors in a 3D content as claimed in claim 7, wherein the disparity and distance to the screen of an object of the 3D content is defined as the average of disparity and average of distance to the screen of each pixel of the object.

* * * * *